United States Patent

Krohm

[11] Patent Number: 5,605,220
[45] Date of Patent: Feb. 25, 1997

[54] HIGH-PERFORMANCE CHAIN SCRAPER CONVEYOR WITH SYMMETRIC TURNING CHANNEL

[75] Inventor: Reinold Krohm, Herne, Germany

[73] Assignee: Udo Adam Maschinenfabrik, Bochum, Germany

[21] Appl. No.: 576,163

[22] Filed: Dec. 21, 1995

Related U.S. Application Data

[63] Continuation of Ser. No. 267,251, Jun. 29, 1994, abandoned.

[51] Int. Cl.$^6$ .................................................. B65G 19/28
[52] U.S. Cl. ...................... 198/735.6; 198/727; 198/729
[58] Field of Search .......................... 198/735.2, 735.6, 198/727, 729, 734, 860.2, 861.2, 731

[56] References Cited

U.S. PATENT DOCUMENTS

| | | | |
|---|---|---|---|
| 3,955,666 | 5/1976 | Braun et al. | 198/734 |
| 4,157,751 | 6/1979 | Grundken et al. | 198/735.2 |
| 4,295,561 | 10/1981 | Yasukawa et al. | 198/735.2 |
| 4,560,059 | 12/1985 | Braun et al. | 198/735.2 |
| 4,637,510 | 1/1987 | Tomlinson | 198/735.6 |
| 4,733,771 | 3/1988 | Grundken et al. | 198/735.6 |
| 4,813,747 | 3/1989 | Klimeck et al. | 198/735.6 |
| 4,815,586 | 3/1989 | Heising | 198/734 |
| 5,156,258 | 10/1992 | Steinkuhl et al. | 198/235.6 |
| 5,224,582 | 7/1993 | Hahn et al. | 198/735.6 |
| 5,495,934 | 3/1996 | Tekathen et al. | 198/734 |

FOREIGN PATENT DOCUMENTS

| | | | |
|---|---|---|---|
| 893327 | 10/1953 | Germany | 198/735.2 |
| 920355 | 10/1954 | Germany | . |
| 3150459 | 9/1983 | Germany | . |
| 3301435 | 7/1984 | Germany | . |
| 3324108 | 1/1985 | Germany | . |
| 3525984 | 1/1987 | Germany | 198/731 |
| 3613551 | 2/1987 | Germany | . |
| 3903347 | 8/1990 | Germany | . |
| 4023873 | 2/1992 | Germany | . |
| 4037659 | 6/1992 | Germany | . |
| 523990 | 8/1976 | U.S.S.R. | 198/735.6 |

*Primary Examiner*—Joseph E. Valenza
*Attorney, Agent, or Firm*—James Creighton Wray

[57] ABSTRACT

A high-performance chain scraper conveyor is equipped with symmetrical channel belts and with a chain conveyor which can turn around corresponding axles so that in combination with the corresponding shape of the channel belts a considerably longer life and higher capacity can be achieved. The ends of the individual channel belts are equipped with overlap tongues and abutting areas across the entire width of the channel diagonally to the transport direction so that the result is an extremely quiet, highly efficient operation. The unit, therefore, is clearly more economical. Channel and herringbone chain conveyors are fully symmetrical over three axles. This means they can be turned separately or together and have at least twice the life of customary chain scraper conveyors. FIG. 3 is to be used for publication.

27 Claims, 3 Drawing Sheets

HIGH-PERFORMANCE CHAIN SCRAPER CONVEYOR WITH SYMMETRIC TURNING CHANNEL

This application is a continuation of Ser. No. 08/267,251 filed Jun. 29, 1994 now abandoned.

BACKGROUND OF THE INVENTION

The invention presents a chain scraper conveyor, especially for underground mining and tunnel construction, in which the material which is to be transported is moved via channel belts which are connected by dog bone shaped toggles at their ends in a swivelling manner by carriers of a chain conveyor, whereby the individual channel belt consists of side profiles which have overlapping, V-shaped guide recesses and a bottom plate which constitutes the conveyor floor which is offset with regard to its thickness on the channel belt ends by alternately forming projecting overlap tongues.

Chain scraper conveyors are used for transporting bulk materials. They are especially used in underground mining operations and tunnel construction where they are used for transporting coal as well as coal mining mix or pure mountain material. However, these conveyors, which are mostly used in the area of mining, do not only transport away the mined minerals, but they also serve as a base from which the mining equipment, which is located on or near them, is operated. They are also used as springers for self-advancing support. Depending on the number of chains, we distinguish single-chain, double-center chain, double-external chain and triple scraping chain conveyors. Its 2 to 300 meters of transport belt consist of individual channel belts which are connected by dog bone shaped toggles at their ends in a swivelling manner. They are able to perform angle movements in the horizontal as well as in the vertical plane. In order to avoid the formation of gaps between the bottom plates at the channel joints through which the fine material of the carrying run can fall into the sub run of the chain scraper conveyor, the bottom plates are alternately equipped with overlap tongues. This is a known and customary solution for this problem. These overlap tongues are rectangular to the longitudinal axle of the channel belt, i.e. parallel to the abutting surfaces (DE-OS 39 03 347 and DE-PS 31 50 459). Another possibility is that they are correspondingly flat curve-shaped and wavy on both channel belt ends along their limitation (DE-OS 40 37 659). Apart from the overlaps with two ground projections, which are offset over the center of the channel, or three interacting coupling claws (hinge principle), which, however, are only concentrated in the area of the discharge width and completely neglect the area of the side profiles and furthermore only prevent the carriers partially from hitting against the overlapping abutting surfaces of the bottom plates with their lower edges and do not fall into the forming indentations when there is overflow in the joint areas, which produces disturbing noise and a weakening of power, the overlap tongues introduced in DE-OS 40 23 873 have the disadvantage that such a model cannot be applied across the entire width of the channel and therefore does not integrate the side profiles into the overall structure. The carrier always runs straight in the direction of two points so that there is no smooth incoming and discharge motion. Furthermore, uneven projections and juts of the joint faces of the overlap tongues result from vertical deflection with maximum effect on the center of the channel so that apart from the high starting jolts caused by the carriers which move erratically and noisily with pitch movements, there is a tendency for higher wear. Apart from the models in accordance with DE-OS 40 37 659.1 further models are known in which the profiles are symmetrical (DE-OS 33 24 108, DE-OS 36 13 551, DE-PS 9 20 355, DE-OS 33 01 435). These known channel profiles in general are symmetrical only around the lateral center axle.

The invention was charged with the task of designing an efficient chain scraper conveyor with low noise level and especially smooth input and discharge characteristics for the carriers, as well as a safe operation of the carriers and long idle times.

SUMMARY OF THE INVENTION

The task is solved in accordance with the invention by the fact that the ends of the individual channel belts run diagonally to the transport direction together with the overlap tongues and abutting surfaces over the entire channel width, consequently including the side profiles which have guide recesses which correspond to the guide shoes of carriers which are pulled by the chain conveyor.

In such a chain scraper conveyor the chain conveyor in the carrying run as well as in the sub run of the conveyor create a smooth input and discharge ratio which guarantees a gradual, gentle and jolt-free transfer of the carriers and the material which is to be transported, whereby the driving power and the noise level are considerably reduced due to the lower drag coefficients. Furthermore, such a chain scraper conveyor offers the possibility to adjust the channel belts to the corresponding conditions, i.e. to make them strong enough so that correspondingly sized chain conveyors with corresponding carriers can move within them. The operational capacity of such chain scraper conveyors and their overall length can be increased considerably.

One model of the invention requires that the side profiles consist of two equal profile pieces whose guide recesses have the same leg angle gradient. Due to the fact that the side profiles consist of two symmetrical parts, it is possible to use even more massive bottom plates in the future. Due to the shape of this side profile underground haulers in transfer operations can be equipped with rigidly screwed down flange connections on the abutting surfaces and can be equipped with all advantages with regard to life expectancy, transportation characteristics, stability and chain conveyor equipment with an exchangeable channel carrying run which also allows access to the sub run. The carriers which are adapted to these side profiles have corresponding guide shoes. Seen diagonally from the transport direction, the guide shoes of the carrier are symmetrical and therefore have a herringbone shape. A chain conveyor with such carriers can be turned over without any problems which is also true for the sigma shaped guide profiles. It is advantageous for the guide shoes to be detachable from the carriers. If the guide shoes, as is planned, are symmetrical seen diagonally from the transport direction, they can produce a smooth and quiet operation together with the above channel profiles and can transport large quantities. It is not necessary to turn over the entire chain conveyor. It is possible to turn over just some of the carriers if a correspondingly high wear should occur.

It is advantageous for the guide shoes to be detachable from the base of the carrier, which is split in the left center and has the same characteristics for its upper and lower parts. This provides the possibility to mount the guide shoes separately or to turn them. They can be fixed between the upper and the lower part without taking any special measures. Due to the special design of the guide shoes on one hand and the base on the other hand, the individual parts can be turned or exchanged when different degrees of wear occur.

An especially efficient chain scraper conveyor is created when the base of the carrier has two horizontal chain links between the upper and the lower part diagonally to the transport direction whose chain link curves have horizontal and vertical herringbone tooth areas and whose chain link legs are set back while forming a kind of groove opposite the ends of the chain link curves. Instead of the customary lumped loads, load carrying joints with areas are present so that the occurring pressings and loads are considerably lower than with other known chains. Another advantage is the reversible application of force on the chain link curves with the herringbone tooth areas because a double surface contact is possible in the gear wheel in a vertical as well as in a horizontal direction. This results in a much improved force introduction. The chain conveyor can be used in either direction, whereby the horizontal herringbone tooth surfaces lead to a centering of the chain wheel in the chain wheel and therefore lead to an exact retraction. The groove supports the carrier on a broad basis, whereby the position of the conveyor is stabilized even when the roll curves are passed. This is especially effective when the herringbone teeth areas have flanks which form a kinematically increasing the arrow head slope from of 120° to 140°.

An especially advantageous model with the diagonal butt joints and jolt-free overlap tongues in accordance with the invention is one in which the ends of the individual channel sections or belts are diagonally opposing in the transport direction, preferably in the form of an equilateral trapezoid. In addition to the advantage of a smooth diagonal joint, this results in a turnability of the individual channels or the entire channel string as well as a plus-minus deflection compensation so that in excess of 15 million tons can be transported over the life of a channel. When the channel string is in a cavity or bracket position, the plus-minus deflection with the alternating joint diagonals on one hand causes the bow deflection which only amounts to 5 mm or 0.2° in reference to angles, with a vertical deflection of no more than 6° to 1.5 meters channel length, and therefore is insignificant and negligible but is eliminated nonetheless. Furthermore, the ends of the carriers run alternately, starting with the diagonal open abutting joint so that a directional effect and synchronization of the chain conveyor is achieved especially since the carriers act like scissors due to the inclination of the channel belt and effortlessly cut off particles in a smooth cut which fell between the butt joints. Due to the diagonally positioned channel belt on a bracket or a cavity, the forced constrictions, which up to this point could only be overcome by forcing the chain conveyor through while using a lot of power and causing considerable wear, have been relieved considerably. This adds another factor to lowering the overall drag coefficient with the help of smooth inlets and soft cross-overs.

Another advantage is achieved by having an overlap width of 40 to 60 mm, preferably 50 mm, and by equipping the overlap tongues with soft slopings or cross-overs. The mentioned overlap as well as the soft slopings strive to keep the flow of the conveyors as quiet as possible and overall strive to guarantee a minimal loss of performance.

The model in which the abutting surfaces have an angle of 6° reduces the drag coefficients and therefore operating noise and other problems. This is true for the model, as already mentioned, in which the overlap tongues and the abutting surfaces run diagonally across the entire width of the channel.

Due to several reasons, the standard length of the channel belts was 1.5 meters up until now. However, the invention calls for a length of at least two meters of the individual channel belts and the corresponding add-on pieces. Due to the lower number of joints and therefore fewer coupler pieces and toggles, this solution is considerably cheaper. Additionally, on a spur length of 300 meters, for example, only 150 channel belts instead of 200 are necessary. This also means that there are 50 fewer possible problem spots. These problem spots have a considerable influence on the drag coefficient, wear, power requirement, noise development, etc., so that apart from considerable cost reductions, organizational and economical advantages can be achieved. It goes without saying that the expansion units must be adjusted to this length, whereby here, too, the corresponding advantages can be realized since fewer dust covers, pullback cylinders or similar items are needed.

Earlier we already indicated that symmetrical carriers and side profiles with corresponding guide recesses are used with the channel belts according to the invention. An especially advantageous angle design is one in which the guide recesses in the side profiles which are made of highly wear resistant and tough cast steel, have an aperture angle of 30° to 40°, preferably 36°. Such an aperture angle provides an additional clearance for the carrier ends or the guide shoes when the carriers are positioned diagonally in return loops or curvy conveyor sections. The angle is such that no oversized wedge or hoop effects occur whereby another abutment pier for lowering the drag coefficients of the conveyor is necessary.

Of further importance is the fact that the lower angle leg in the carrying run of the guide recess, seen from the center of the channel, starts before the profile edge of the press angle on the bottom plate and therefore preferably is 1.85 times longer than the upper angle leg. In the customary profiles the lower angle leg starts at the profile edge or, even worse, further to the outside under the upper guide. This causes the free-wheel cones to become obtuse-angled, which is another disadvantage. In the conveyor according to the invention, however, the lower legs which start at the bottom plate of the V-shaped guide recess are 1.85 times longer than the corresponding upper legs. The V-shaped guide recesses are constructed as equilateral trapezoids in their cross section. The parallel sides have a ratio of 83:31=2.68:1 and ensure that the exchangeable guide shoes of the carriers of the chain conveyor can not only be symmetrical and turnable, but also pointed, sharp, sleek and plough share shaped. A thorough cleaning and scavenger effect is the result. This effect protects the side profiles from crustings and wafering. The slide characteristic of the chain conveyor itself is considerably improved even with rolling operation or one-sided nose-heaviness, which is the case in descending face advance. Consequently the drag coefficients and the power requirement are notably reduced. Due to the fact that the long lower legs of the V-shaped guide recess reach into the delivery width of the conveyor channel, good access is provided for the welders from a manufacturing point of view which simultaneously produce seams which are deep and protected against early wear from both sides of the bottom plate. These seams continuously wear with the bottom plates so that the stability of the channel is not affected prematurely. For this reason there are reinforcement enlargements at the ends of the lower legs which stretch to the delivery width to the outside and whose overall thickness increases to 1.8 times the thickness of the bottom plates. The channel profile thus receives an additional reinforcement in the wear critical weak zone. In addition, the cast side profiles are very strong so that the tips of the press angles and the lower legs reach the thickness of the overlap tongues with 25 mm, or half the bottom plate thickness, and flow into the outside profile wall which is as strong as the bottom plate so that the conveyor channel has an enormous flexural strength due to the high section modulus. The flexural strength takes the reaction forces of the continuous shaft lining, the return devices and the mining equipment into account; in other words, the strenuous operation in underground mining or construction. Furthermore, there are large abutting surfaces at the ends of the channels. These abutting surfaces take up the huge strain forces which are alongside the conveyor, although the cross-over width is smaller by 24 mm or 18% with only 130 mm than the cross-over width in similar conveyors, so that the rolling or sliding effect, while accelerating in steep orientations, is reduced for falling transportation items.

Not only the herringbone tooth chain as described earlier but also other, especially strong chains can be used advantageously with the channel belt since it is no more than 121 mm high in the carrying run and 9 mm higher in the sub run. Since the sub run therefore has a higher clearance with 130 mm as compared to the conventional groove profiles of 8 mm, said herringbone tooth chain can be equipped in a simplified manufacturing process with chain sizes up to 38, with vertical links made of round steel which is no more than 121 mm high and has a standard size. The height of the carrier and the vertical links of the presently strongest chain is also 121 mm so that there is a clearance of 9 mm in the sub run which, in comparison with the customary profiles, is larger by 2 mm or 25%. Due to this advantageous design, the optional equipment possibilities for the smaller chains with sizes 42, 38 and 34 are with carriers which are 121 mm high, whereby the chains run in the shadow of the carriers and under tension without touching the bottom plate and the flush-mounted sheet metal plate of the channel or, as an alternative, with preferred 115 mm carriers. Especially in the critical sub run, the result is a clearance of 12 mm which, compared to customary channel profiles, is larger by 5 mm or 71%. This makes it easier to clear bottlenecks which are caused by cavities and brackets by deflecting the channel belts at the inlet and discharge of the channels by eliminating wedges and blocks as well as reducing the frictional wear. The drag coefficients for both runs are reduced considerably since the clearance in the carrying run also increases by approximately 3 mm from 9 mm to 12 mm or 33%. Overall this means that it is possible to conserve large amounts of energy. In special and emergency situations it is possible to operate the conveyor in accordance with the invention with an open sub run, since the carrier which is 115 mm high and has a clearance of 12 mm in the sub run still has a distance of 3 mm to the bottom and does not sag or drag along the bottom, as is the case with many other customary models. The fact that the conveyor in accordance with the invention can be operated even when using corresponding new carriers together with customary round steel or special chains whose breaking force is weaker speaks for the conveyor's economic characteristic since it is possible to use up any stock of these technically obsolete chains.

In accordance with an advantageous model of the conveyor, the channel belt and the chain conveyor are symmetrical with the carriers over axles I, II, and III. This results in the turnability, which in turn prolongs the life of the chain conveyor, over axles II and III which can transport in either direction, and are equipped with exchangeable guide shoes.

Apart from being able to turn the entire channel string, it is also possible to turn each individual conveyor channel over axle I. This turnability is especially effective in underground operations, for example, when the flush-mounted steel plate is fixed to the side profiles by a vertical screw connection or when the conveyor is operated with an open sub run.

In an effort to account for the trend to use constructions made of casting, and thus to minimize the number of connection pieces for the add-on pieces, a preferred and repair friendly model ensures that the shorter press angles of the sub run are connected with, preferably welded to, a flush-mounted steel plate which rests across the entire channel width. This reenforces the wear prone tips of the press angles by 100%. Additionally, it is possible to heat erode or burn down the flush-mounted steel plate after the carrying run is worn completely and to insert it into and weld to the worn carrying run between the track rails. After this type of repair is completed, it is possible to turn the channel bases and to continue in the same transport direction without adversely affecting the mining equipment.

Another advantage is that at the same time a path, which is required for the operation of coal cutting machines, is created by making the flush-mounted steel plate extend past the press angle and form a track rail.

The life of such chain scraper conveyors is also prolonged by the fact that the bottom plate has a thickness of 50 mm, i.e. is 10 mm thicker than the customary bottom plates. This means that this thickness can proportionally reinforce the relatively sensitive overlap tongues on the channel belts with a thickness of 25 mm by 25% so that they are more resistant.

Such a chain scraper conveyor is suitable for the operation in plane and cutting enterprises, as well as for combined mining. Due to its profile form, it can be operated with a minimal amount of energy and can accommodate huge reaction powers since it is equipped with toggle connecting chain links on the sides at the ends of the conveyor channel elements on both sides, which exceed the strongest conventional connection of 2×3,000 KN with a breakage force of 2×4,500 KN 1.5 fold or by 50%. This makes it possible for the first time to use conveyors which are 1.5 meters wide and up to 500 meters long, whereby, in accordance with the invention, the channel belts have pockets on the outsides of the side profiles for the dog bone shaped toggles which, when seen cross sectionally, resemble an equilateral trapeze, whereby the toggles are formed correspondingly. The symmetrical shape of the toggle is such that it can be inserted into the corresponding pockets in the channel end or couple pieces from the side when it is in its turning position. Before the toggles are installed in these pockets, square-head bolts M 30×2 are screwed into them, onto which collar nuts are screwed which are flush with the channel outside width. The collar nuts shift to the respective toggle head and secure it in its position. Due to the tensile burden, the toggle and the couple pieces act as a lock since the contact surface of these parts is diagonal and undercut with an angle of the safety conus which opens to the outer edge of the channel. The toggle is pulled into the pockets via so-called draw-in slopes and is secured against moving without burdening the collar nuts. The coupler pieces or the pockets respectively are die-formed parts which preferably are welded on in a two-part channel side profile. There is a possible modification in which the side profile is cast in one piece with the coupler pieces, which saves a tremendous amount of manual welding. Furthermore, this renders the critical points of such a welded connection and its cross sections for connection obsolete. In order to allow for the alignment of the channel string and to avoid the forming of projecting parts, but also for transmitting the horizontal and vertical asymmetrical loads, the coupler pieces have front projecting parts and recesses in order to center the channels and in order to seal. The projecting parts alternately interact with their overlap of 50 mm above and below the toggle and form an offset channel double joint per side profile, while evenly exceeding the theoretical channel section. The longitudinal clearance of the toggle connecting chain ring with 19 mm is such that it preserves the necessary remaining overlap and that it is possible to have vertical deflections of ±6° for mastering cavities and brackets and horizontal deflections of ±1.5° for mastering return loops and curve positions on the channel belts. In combination with the welded flush-mounted steel plate and the moveable rails, the projecting parts on the coupler pieces are reinforced and stabilized considerably so that together with the equally alternately inter-acting overlap tongues, which also include the side profiles in their extensions to the outside, achieve a complete overlap across the entire width of a channel belt. This is accomplished for the first time. These overlaps stop the damaging pincher effects of stuck dirt, small things or foreign bodies. It prevents coal fines from falling through into the sub run or the track area.

As already mentioned, the toggles have knotty enlargements at their ends which resemble a dog bone shape, while the shaft or tie rod which connects these reinforcement heads has a notch which indicates the predetermined breaking point in the center. Such a toggle must be secured and can accommodate said high forces.

The invention is especially characterized by the fact that the fully symmetrical universal-turning channel and its new type of channel profile represents a high-performance strut conveyor which, with an operational capacity of 15 million tons, exceeds the life of customary strut conveyors by 200% or can be used for a period which is three times that of customary conveyors. This is enhanced by the toggle connecting chain link with a breakage force of 2×4,500 KN and the corresponding complete overlap with the overlap tongues and joint areas which run diagonally to the direction of transport. The perfect clearances, which are much more favorable than those in conventional profiles, allow the use of corresponding chain conveyors so that the result is not only a longer tool life, but also wider conveyor channels and overall longer chain scraper conveyors. It is also feasible and advantageous to operate the carriers according to the invention and the channel belts with weaker, customary round steel and vibrating chains in order to use up the chains in stock. The channel belt in accordance with the invention and the corresponding chain conveyor are fully symmetrical over three axes so that the result is an advantageous turnability of the entire channel string but also of the individual conveyor channel or the individual channel belt. Overall this invention presents a chain scraper conveyor which can be used in many different areas in its entirety, i.e. with the chain conveyor and in the new form, but also for example in the form of new channel elements together with customary chain strings, whereby there are still advantages with these models.

Further details and advantages of the object of the invention can be taken form the following description of the respective drawing in which a preferred model and the corresponding details and individual parts are shown.

DETAILED DESCRIPTION OF THE PREFERRED EMBODIMENTS

Figure 1:
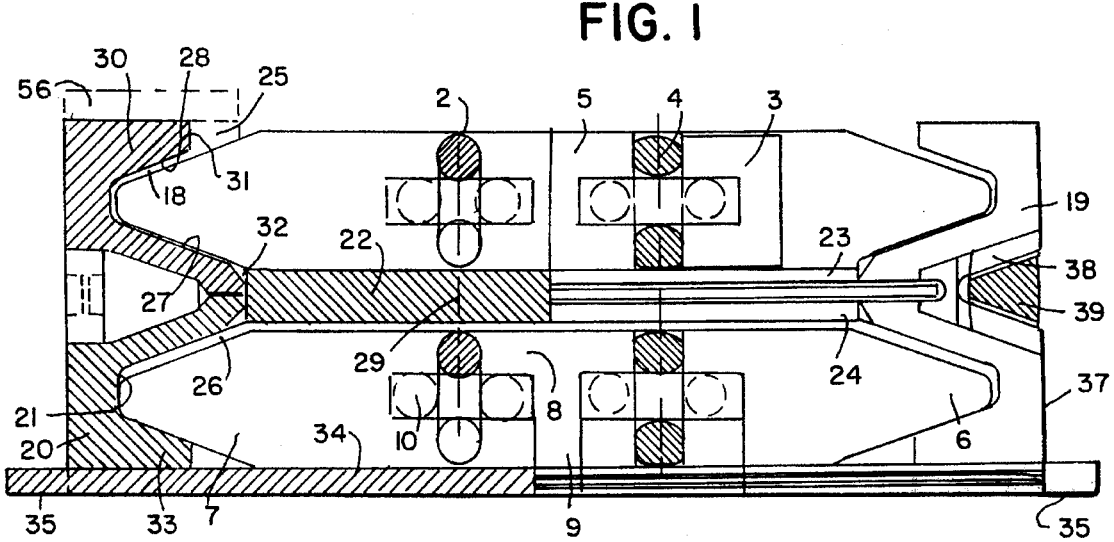
FIG. 1 shows a section through the chain scraper conveyor with herringbone chain conveyor.

FIG. 1 shows the cross section of a chain scraper conveyor 1 so that carrier 3 of chain conveyor 4 which just passes channel belt 2 is visible. This carrier 3 consists of a turnable base 5 and guide shoes 6, 7 which are attached to the base but can be removed. As can be seen according to FIG. 5, the base 5 consists of two identical parts upper part 8 and lower part 9 which are in the outer area and hold the guide shoes 6, 7.

Figure 4:
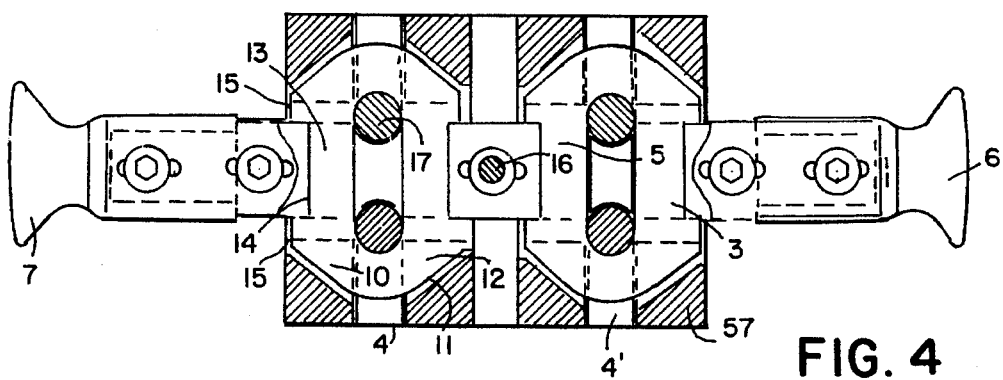
FIG. 4 shows a top view of a carrier with detachable guide shoes.

Horizontal chain links 10 are attached between upper part 8 and lower part 9 and are kept in place by locking screws 16, which can be seen in FIG. 4.

The respective channel belts 2 consist of side profiles 19, 20 which have two identical guide recesses 18, 21 and a bottom plate 22 which is welded in between them. FIG. 1 shows that this bottom plate is relatively strong and generally has a thickness of 50 mm.

Due to the relative strength of the bottom plate 22, the overlap tongues 23, 24, which are located at the end of the channel belts 2, are reinforced correspondingly.

With their guide shoes 6, 7, carriers 3 run in the carrying run 25 as well as in the sub run 26, whereby they are propped against the angle legs of the guide recesses 18, 21.

FIG. 1 shows that lower angle leg 27, which is in the carrying run 25, is much longer than the upper angle leg 28. This means that the outward extending arrow-shaped guide shoe 5, 7 has better guide and slide support, whereby the connection point or the starting point of the lower angle leg 27 is located in the direction of the channel center 29. The expert recognizes immediately that this means that it is much easier to reach welding seam 32 since it is located far from the profile edge 31 of the upper press angle 30.

The upper press angle 30 can, as indicated in FIG. 1, be reinforced by a track rail 56 without losing the advantage of the exposed welding seam 32. It is possible to extend the profile edge 31 further so that it is flush with the front edge of the track rail 56 if such a track rail is to be installed permanently.

The lower press angle 33 in the sub run 26 is reinforced by the flush-mounted steel plate, whereby this flush-mounted steel plate 34 can be extended past the outer edge 37 in order to function as a track or track rail 35 respectively if this should be necessary in the individual case.

In the area of outer side 37, a pocket 38 is located which is to receive toggle 39.

FIG. 1 shows two different models of conveyor chain 4, whereby a customary chain conveyor is on the left side. On the right side is a reinforced chain conveyor in which the vertical links are flattened.

Figure 2:
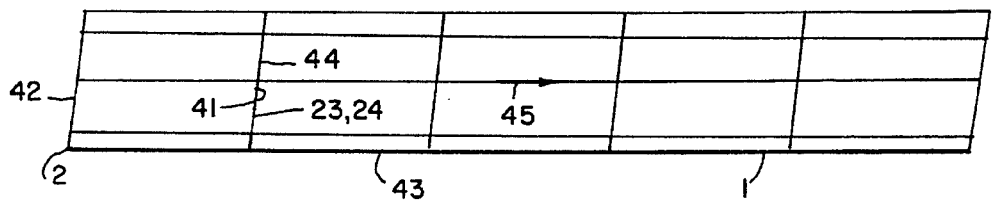
FIG. 2 shows a top view of a chain scraper conveyor with overlap tongues and abutting areas which run diagonally to the transport direction.
Figure 3:
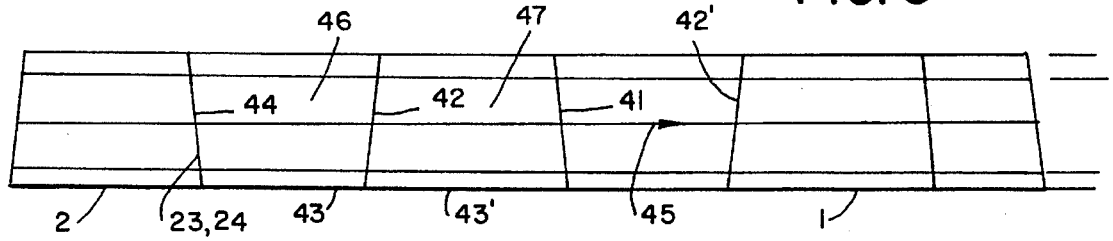
FIG. 3 shows a top view of a chain scraper conveyor with abutting areas and overlap tongues which run opposite and diagonally to the transportation direction.

FIG. 2 and FIG. 3 each show the top view of a channel string without chain conveyor in order to give a clearer view of the area of the overlap tongues 23, 24 on the opposite ends 41, 42 of the respective channel sections 2, 43. The overlap tongues 23, 24, as well as the abutting areas 44, run diagonally and are synchronized in transport direction 45 in FIG. 2. This means that the add-on pieces, which are not shown here, have the same length, which is advantageous for rigging such a chain scraper conveyor 1.

FIG. 3 shows channel sections 2, 43, 43' which run diagonally in opposing direction to the transport direction 45. The individual channel sections 2, 43 are shaped like trapezoids 46, 47 in this lay-out, whereby these trapezoids are inserted with alternately shorter and longer edges. The presented model requires the use of add-on pieces with different lengths. Especially with welded models this is not a problem since the corresponding equipment is provided.

Figure 5:
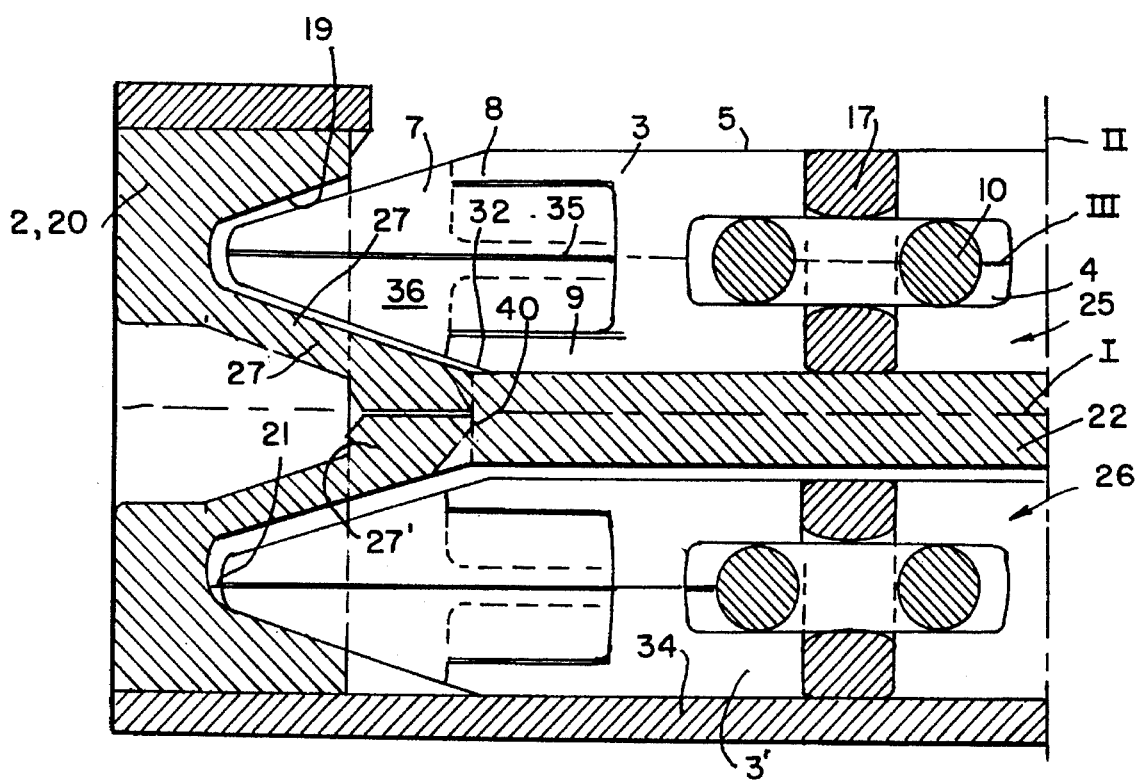
FIG. 5 shows a partial section through a chain scraper conveyor with the axes which are imperative for the turnability.

FIG. 5 basically corresponds to the presentation according to FIG. 1. The difference is that here the individual axes are indicated, around which the individual parts or the entire conveyor is turnable. This ability to turn is provided by the fact that the channel sections 2, 42 as well as the conveyor chain 4 are fully symmetrical in the shape of a herringbone chain conveyor over axes I, II and III. This does not only result in the ability to turn, which prolongs the life of the conveyor, over axes II and III. Apart from being able to turn the entire channel string, it is possible to turn each individual channel 2, 43 around axes I. This is especially advantageous for underground operations when the flush-mounted steel plate 34 is bound against side profiles 19, 20 by a screwed connection, not shown in FIG. 5.

As far as the guide shoe 6, 7 is concerned, FIG. 5 shows that due to the shape of base 5 an oblong opening appears in which the clamping piece 35 of the guide shoe 7 can be inserted so that the slide piece 36 is supported advantageously.

FIG. 5 also clearly shows that the long angle legs 27, 27' each have a kind of nose 40 at their ends which presents a favorable welding seam.

FIG. 4 shows a top view of a carrier 3 with base 5, which has been mentioned previously, and the guide shoes 6, 7 located at the ends. These carriers 3 consist of upper part 8 and lower part 9, which cannot be seen here, and which are connected and set via a locking screw 16. At the same time, this causes the horizontal chain links to be fixed. Vertical chain links 17 rest against this support. Due to the special shape of the horizontal chain links 10, a two-dimensional or rolling line support of the vertical chain links 17 is provided.

Furthermore, these horizontal chain links 10 have correspondingly formed chain link curves 11 with herringbone tooth areas 12 so that the result is a favorable support, especially in chain wheel 57. The chain link legs 13 have the shape of a kind of groove 14 which provides them with good support in carriers 3. Ends 15 of these chain link legs 13 are shaped to where the result is a favorable support in the chain wheel.

Figure 6:
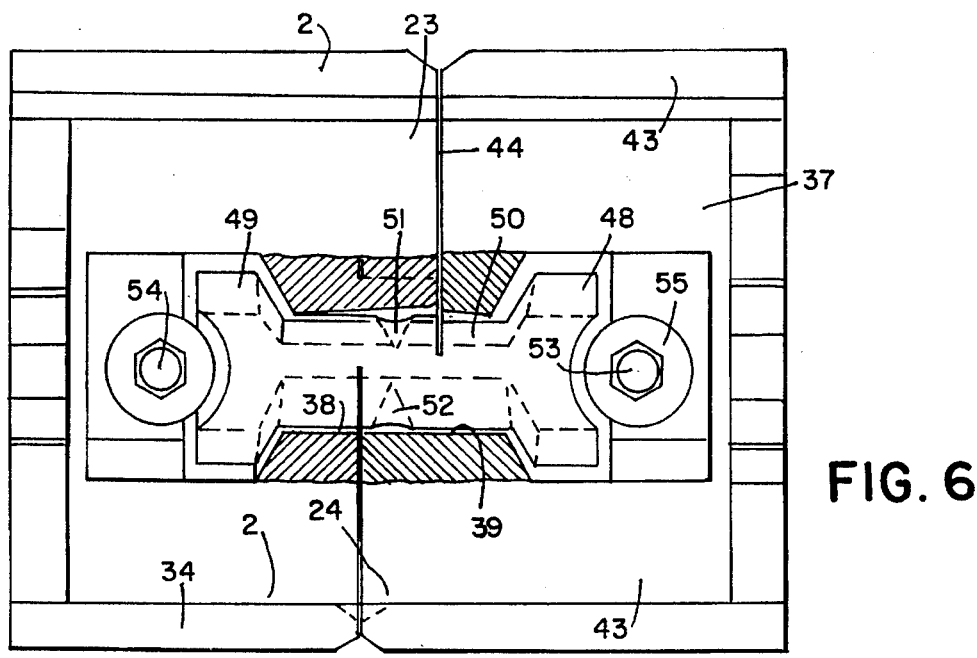
FIG. 6 shows a side view of the chain scraper conveyor in the abutting area.

FIG. 6 shows a side view of two channel sections 2, 43 which meet. It is obvious that the joint area 44 "bends" so that the result is overlap tongues 23 and 24, which have been mentioned numerous times. This area is secured by a toggle connection and kept flexible. It consists of toggle 39 which is inserted in pocket 38. Toggle 39 is dog bone shaped at its end, i.e. has heads 48, 49 and a shaft 50 which connects the two. In the center of the shaft there are notches 51, 52 which indicate a predetermined breaking point which always remains the same.

The cross section of toggle 39 has the shape of an equilateral trapezoid, which is indicated in FIG. 1. It is inserted in correspondingly shaped pockets 38, whereby square-head bolts 53, 54 are inserted into these pockets 38 before the toggle 39 is inserted. Collar nuts 55, which are flush with the channel outer width, are screwed on the square head bolts which, as shown in FIG. 6, overlap the respective head 48, 49, and in doing so secure toggle 39 in its position. Since toggles 39 have a breakage force of 2×4,500 KN and pull themselves into pockets 38 when there is pull, they offer the necessary toggle connection chain links which is necessary in the operation of customary but also widened and extended super conveyors.

Figure 7:
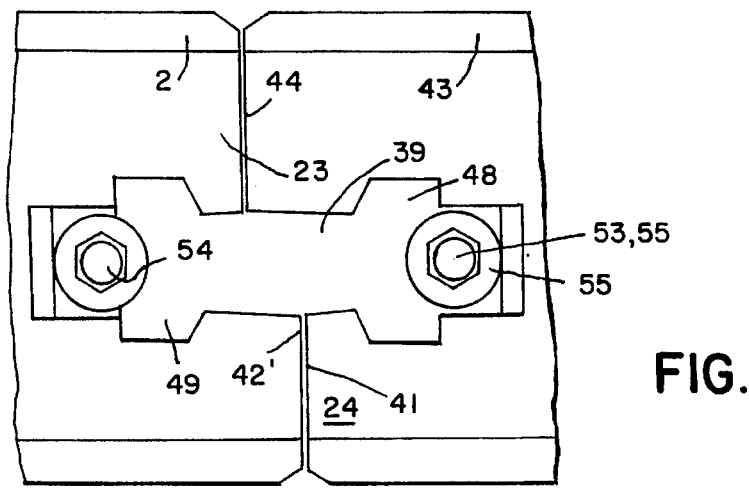
FIG. 7 shows a simplified view in accordance with FIG. 6 with the toggle connecting chain ring.
Figure 8:
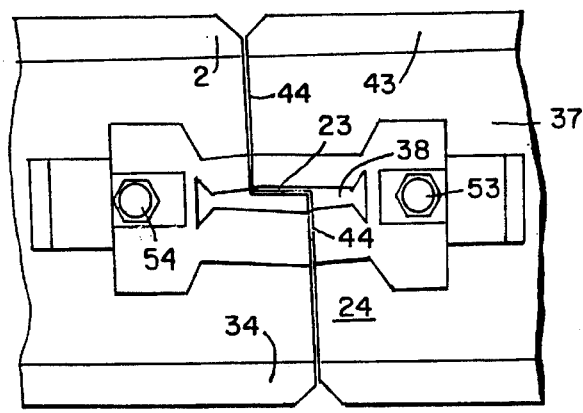
FIG. 8 shows the connecting area in accordance with FIG. 7 with removed toggle.

FIGS. 7 and 8 show a simplified picture of the toggle connection chain links, represented by a wood model which clearly shows that toggles 39 cover the overlap area precisely. This can especially be seen in FIG. 8 where the corresponding pocket 38 or recess can be seen in the two ends 41, 42 of channel belts 2, 43.

FIG. 7 shows a mounted toggle which is held in place by the two square-head screws 53, 54 and the collar nuts 55, while FIG. 8 indicates and shows how the square-head screws 53, 54 are simply fixed and inserted in the base area of the pocket 38 or the recess respectively in order to provide the necessary retaining forces.

All presented characteristics, including those which can be derived from the drawings themselves, are in themselves and in combination an integral part of the invention.

I claim:

1. Chain scraper conveyor with channels for transporting material comprising plural channel elements, plural dog bone shaped toggles connected to opposite ends of the channel elements in a swivelling manner for providing upper material carrying runs and lower return runs for carriers of a chain scrape conveyor, each channel section having side profiles with adjacent channel sections having abutting end surfaces, said side profiles being formed with V-shaped carrier shoe guide recesses, and a bottom plate forming a conveyor floor, said floor being offset on the ends of the channel belt by alternately formed projecting overlap tongues, and guide shoes provided on the carriers, wherein the side profiles with the guide recesses are shaped complementary to the guide shoes, wherein the ends of each channel section together with the overlap tongues and the abutting surfaces run diagonally and non-perpendicularly in a straight line across the entire width of the channels and together with the side profiles form structures running diagonally to a transport direction.

2. The chain scraper conveyor of claim 1, further comprising each side profile having two equal profile pieces with the guide recesses having equal angle gradients.

3. The chain scraper conveyor of claim 1, wherein the guide shoes are symmetrical and have arrow-shaped heads and mounting shafts extending into the carrier and are formed in a direction diagonal to the transport direction.

4. The chain scraper conveyor of claim 1, wherein the ends of each channel section are formed diagonally to the transport direction and oppositely to each other, each channel section having a profile of an equilateral trapezoid.

5. The chain scraper conveyor of claim 1, wherein the side profiles are overlapping and wherein the overlapping side profiles each have an overlap width in a range of 40 to 60 mm, and wherein the overlap tongues have softening slope.

6. The chain scraper conveyor of claim 5, wherein the overlapping side profiles each have an overlap width in a range of 50 mm.

7. The chain scraper conveyor of claim 1, wherein each abutting surface has an angle of 6° to a normal direction perpendicular to the transport direction.

8. The chain scraper conveyor of claim 1, each channel section and the corresponding overlap tongues are at least two meters long.

9. The chain scraper conveyor of claim 1, wherein the guide recesses are of highly wear resistant and tough cast steel material, and wherein each recess has an aperture angle of 30° to 40°.

10. The chain scraper conveyor of claim 9 wherein the guide wherein each recess has an aperture angle of 36°.

11. The chain scraper conveyor of claim 2, further comprising each guide recess having lower and upper angle legs, said lower angle leg being located in a carrying run, and a press angle provided on the bottom plate and having a profile edge, the lower angle leg extending from a distance spaced from the profile edge of the press angle and being at least 1.85 times longer than the upper angle leg for welding access to a junction of the longer carrying leg and the floor.

12. The chain scraper conveyor of claim 11, wherein the channel element has a height not more than 121 mm in the carrying run and has a clearance higher than 9 mm in a sub run of the carrying run.

13. The chain scraper conveyor of claim 1, wherein the channel element and the chain conveyor are symmetrical with the carriers in rotation axes I, II, and III, said axes corresponding to x, y and z axes, respectively.

14. The chain scraper conveyor of claim 12, wherein the sub run has a shorter press angle, said angle being connected to a flush-mounted sheet metal plate having a width not less than a width of the channel.

15. The chain scraper conveyor of claim 14, wherein the flush-mounted sheet metal plate extends to a point beyond the press angle to form a track rail.

16. The chain scraper conveyor of claim 1, wherein the bottom plate has a thickness of 50 mm.

17. The chain scraper conveyor of claim 1, further comprising the channel elements having pockets for accommodating the dog-bone shaped toggles on outer sides of respective side profiles, each pocket having cross-sectional profiles of an equilateral trapezoid, and wherein each toggle has complementary trapezoidal cross-sectional profiles as corresponding pockets.

18. The chain scraper conveyor of claim 17, wherein ends of each toggle are connected by a shank, said ends being formed as bulging heads, a notch provided centrally in each shank for presetting a predetermined breaking point.

19. The chain scraper conveyor of claim 1, wherein the guide shoes are detachable from a base of the carrier, the base of the carrier further comprising a split central portion and similarly profiled upper and lower portions.

20. The chain scraper conveyor of claim 19, wherein each base comprises receivers for two horizontal chain links having chain link curves on chain link ends and chain link sides being provided between the upper and the lower portions of the base and each receiver having grooves formed in the upper and lower portions of the base for holding the chain link sides for abutting the ends of the horizontal chain links.

21. Chain scraper conveyor apparatus comprising multiple channel sections joined and held together forming a conveyor elongated in a transport direction with the channel sections having side profiles and floors extending between the side profiles, the side profiles and the floors of adjacent sections abutting, and the floors having projecting tongues overlapping each other where the floors of adjacent sections abut, the floors abutting and the tongues overlapping in directions diagonal and non-perpendicular in a straight line the directions being diagonal to the transport direction for facilitating ease of passage of a chain-hauled scraper over the floor with decreased resistance and noise.

22. The apparatus of claim 21, wherein the floors abut and the tongues overlap in parallel directions in each junction.

23. The apparatus of claim 21, wherein the floors abut and the tongues overlap in divergent directions on opposite ends of each channel section, forming trapezoidal planforms of the channel sections.

24. The apparatus of claim 21, wherein the side profiles have end portions which form steps for interfitting with steps of abutting ends of side profiles of adjacent channel sections.

25. The apparatus of claim 24, wherein the side profiles have inward extending dog bone link receiving pockets with trapezoidal cross-sections perpendicular to the transport directions, and further comprising dog bone links having trapezoidal cross-sections perpendicular to the transport direction fitted in trapezoidal recesses of the side profiles, bolts secured in the profiles at ends of the dog bone links, and nuts on the bolts and engaging ends of the dog bone links for holding the links in the recesses.

26. The apparatus of claim 21, wherein the side profiles have inward extending dog bone link receiving pockets with trapezoidal cross-sections perpendicular to the transport directions, and further comprising dog bone links having trapezoidal cross-sections perpendicular to the transport direction fitted in trapezoidal recesses of the side profiles, bolts secured in the profiles at ends of the dog bone links, and nails on the bolts and engaging ends of the dog bone links for holding the links in the recesses.

27. Chain scraper conveyor apparatus comprising channel sections for joining together in a transport direction for forming an elongated conveyor, the channel sections having floors and side profiles at sides of floors, edges of adjacent floors and side profiles abutting to form the elongated conveyors, wherein the side profiles have inward extending dog bone link receiving pockets with trapezoidal cross-sections perpendicular to the transport directions, and further comprising dog bone links having trapezoidal cross-sections perpendicular to the transport direction fitted in trapezoidal recesses of the side profiles, bolt securing means secured perpendicularly to the links in the profiles at ends of the dog bone links, and enlarged ends of the bolt securing means for engaging ends of the dog bone links for holding the links in the recesses.

* * * * *